US010212415B2

(12) United States Patent
Wu et al.

(10) Patent No.: US 10,212,415 B2
(45) Date of Patent: Feb. 19, 2019

(54) IMAGE PROCESSING SYSTEM, IMAGE PROCESSING METHOD, POSITION DETERMINING METHOD AND DISPLAY SYSTEM

(71) Applicant: BOE TECHNOLOGY GROUP CO., LTD., Beijing (CN)

(72) Inventors: Naifu Wu, Beijing (CN); Wei Wei, Beijing (CN); Kun Wu, Beijing (CN); Heliang Di, Beijing (CN); Tao Wang, Beijing (CN); Chiachiang Lin, Beijing (CN); Chunmiao Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 108 days.

(21) Appl. No.: 14/909,708

(22) PCT Filed: Aug. 4, 2015

(86) PCT No.: PCT/CN2015/085992
§ 371 (c)(1),
(2) Date: Feb. 2, 2016

(87) PCT Pub. No.: WO2016/145765
PCT Pub. Date: Sep. 22, 2016

(65) Prior Publication Data
US 2017/0041593 A1 Feb. 9, 2017

(30) Foreign Application Priority Data
Mar. 17, 2015 (CN) .......................... 2015 1 0116441

(51) Int. Cl.
*H04N 13/00* (2018.01)
*H04N 13/344* (2018.01)
(Continued)

(52) U.S. Cl.
CPC ......... *H04N 13/344* (2018.05); *H04N 13/305* (2018.05); *H04N 13/31* (2018.05);
(Continued)

(58) Field of Classification Search
CPC ..... H04N 13/376; H04N 13/31; H04N 13/398
(Continued)

(56) References Cited

U.S. PATENT DOCUMENTS

2013/0147929 A1* 6/2013 Irie .................... H04N 13/0425 348/54
2014/0049540 A1 2/2014 Shimoyama et al.

FOREIGN PATENT DOCUMENTS

CN 101199210 B 5/2010
CN 101984670 A 3/2011
(Continued)

OTHER PUBLICATIONS

First Office Action regarding Chinese application No. 201510116441.2, dated Apr. 12, 2016. Translation provided by Dragon Intellectual Property Law Firm.
(Continued)

*Primary Examiner* — Jeffery Williams
(74) *Attorney, Agent, or Firm* — Harness, Dickey & Pierce, P.L.C.

(57) ABSTRACT

The present disclosure provides an image processing system, an image processing method, a position determining method and a display system. The image processing system includes a processing module configured to process at least a portion of original views in an original image to be displayed currently, so as to obtain a target image including the processed views, each processed view including an identifier; and a display module configured to display the target image, so as to enable a viewer to determine, in accordance with a combination of the identifiers in the target
(Continued)

image, a position for viewing a 3D image. According to the present disclosure, it is able to guide the viewer to view the glassless 3D image at an extremely low cost.

12 Claims, 4 Drawing Sheets

(51) Int. Cl.

| | |
|---|---|
| ***H04N 13/305*** | (2018.01) |
| ***H04N 13/376*** | (2018.01) |
| ***H04N 13/31*** | (2018.01) |
| ***H04N 13/398*** | (2018.01) |
| *H04N 13/106* | (2018.01) |

(52) U.S. Cl.
CPC ......... *H04N 13/376* (2018.05); *H04N 13/398* (2018.05); *H04N 13/106* (2018.05)

(58) Field of Classification Search
USPC ........................................................... 348/51
See application file for complete search history.

(56) References Cited

FOREIGN PATENT DOCUMENTS

| | | | |
|---|---|---|---|
| CN | 102067611 | A | 5/2011 |
| CN | 102300111 | A | 12/2011 |
| CN | 102497570 | A | 6/2012 |
| CN | 102572483 | A | 7/2012 |
| CN | 102802014 | A | 11/2012 |
| CN | 102970559 | A | 3/2013 |
| CN | 103096103 | A | 5/2013 |
| CN | 103167311 | A | 6/2013 |
| CN | 103281550 | A | 9/2013 |
| CN | 103369335 | A | 10/2013 |
| CN | 103477646 | A | 12/2013 |
| CN | 104252058 | A | 12/2014 |
| CN | 104702939 | A | 6/2015 |
| EP | 2395762 | A2 | 12/2011 |
| EP | 2863635 | A1 | 4/2015 |
| FR | 2888000 | A1 | 1/2007 |
| JP | 5404246 | B2 | 1/2014 |
| WO | WO-2012143836 | A1 | 10/2012 |

OTHER PUBLICATIONS

International Search Report and Written Opinion dated Nov. 10, 2015 for PCT/CN2015/085992. Translation provided by Dragon Intellectual Property Law Firm.
Second Office Action regarding Chinese application No. 201510116441.2, dated Nov. 29, 2016. Translation provided by Dragon Intellectual Property Law Firm.
Extended European Search Report, dated Sep. 28, 2018, corresponding to EP15839115.

* cited by examiner

IMAGE PROCESSING SYSTEM, IMAGE PROCESSING METHOD, POSITION DETERMINING METHOD AND DISPLAY SYSTEM

CROSS-REFERENCE TO RELATED APPLICATIONS

The present application is the U.S. national phase of PCT Application No. PCT/CN2015/085992 filed on Aug. 4, 2015, which claims a priority of the Chinese patent application No. 201510116441.2 filed on Mar. 17, 2015, the disclosures of both of which are incorporated herein by reference in their entirety.

TECHNICAL FIELD

The present disclosure relates to the field of stereo display technology, in particular to an image processing system, an image processing method, a position determining method and a display system.

BACKGROUND

Currently, three-dimensional (3D) image display generally includes glass-type 3D display, head-mounted 3D display and glassless 3D display. There are various glassless 3D display techniques, and among them, a lens array technique and a parallax barrier technique are commonly used.

A glassless 3D display system mainly consists of a two-dimensional (2D) display device (including liquid crystal display device, plasma display device, field emission display device and organic light-emitting diode (OLED) display device) and a light splitter (e.g., a grating). Slit grating or lenticular grating may be used.

In the related art, in order to ensure a viewer to be located within a continuous viewing region, the light splitter is adjustable. To be specific, during the operation of the glassless 3D display system, a current viewing distance from the viewer to a screen is determined, and then synthetic parameters of a 3D image and parameters of the controllable light splitter are adjusted jointly, so as to adjust an appropriate viewing distance for the glassless 3D display system to the current viewing distance.

However, for the above method, it is required to provide the adjustable light slitter, resulting in a remarkable increase in the production cost. In addition, when there exist several viewers at different positions and different viewing distances in the viewing region, the above method does not work and thus is quite limited.

SUMMARY

An object of the present disclosure is to provide an image processing system, an image processing method, a position determining method and a display system, so as to locate viewing positions for several viewers at a low cost.

In one aspect, the present disclosure provides in some embodiments an image processing system, including: a processing module configured to process at least a portion of original views in an original image to be displayed currently, so as to obtain a target image including the processed views, each processed view including an identifier; and a display module configured to display the target image, so as to enable a viewer to determine, in accordance with a combination of the identifiers in the target image, a position for viewing a 3D image.

Alternatively, the original image includes a plurality of views arranged sequentially, and the processing module includes a first setting module configured to set a first identifier and a second identifier for a first view and a last view respectively, without any identifiers for the other views between the first view and the last view. When the first view with the first identifier and the last view with the second identifier are viewed by the viewer as a left-eye image and a right-eye image respectively, the first identifier and the second identifier are combined into a third identifier different from the first identifier and the second identifier, and the third identifier indicates that the viewer is located at a region where a left viewing area and a right viewing area are reversed.

Alternatively, the original image includes a plurality of views arranged sequentially, and the processing module includes a second setting module configured to set a fourth identifier for a view other than a first view and a last view. When being viewed by the viewer as a left-eye image and a right-eye image respectively, the first view without any identifier and the last view without any identifier indicate that the viewer is located at a region where a left viewing area and a right viewing area are reversed.

Alternatively, the original image includes a plurality of views arranged sequentially, and the processing module includes: a view amount determination module configured to determine an amount of the views arranged sequentially; and a third setting module configured to, when the amount of the views is greater than or equal to 5, set a first identifier and a second identifier for a first view and a last view respectively, without any identifiers for the views between the first view and the last view, and when the amount of the views is less than 5, set a fourth identifier for a view other than the first view and the last view. When the amount of the views is greater than or equal to 5 and the first view with the first identifier and the last view with the second identifier are viewed by the viewer as a left-eye image and a right-eye image respectively, the first identifier and the second identifier are combined into a third identifier different from the first identifier and the second identifier. The third identifier indicates that the viewer is located at a region where a left viewing area and a right viewing area are reversed. When the amount of the views is less than 5 and the first view without any identifier and the last view without any identifier are viewed by the viewer as a left-eye image and a right-eye image, the first view without any identifier and the last view without any identifier indicate that the viewer is located at a region where a left viewing area and a right viewing area are reversed.

Alternatively, the original image includes a plurality of views arranged sequentially, and the processing module includes: a fourth setting module configured to set a first identifier and a second identifier for a first view and a last view respectively; and a fifth setting module configured to set a fourth identifier for a view other than the first view and the last view. When the first view with the first identifier and the second view with the second identifier are viewed by the viewer as a left-eye image and a right-eye image respectively, the first identifier and the second identifier are combined into a third identifier different from the first identifier and the second identifier, and the third identifier indicates that the viewer is located at a region where a left viewing area and a right viewing area are reversed. When the first view with the first identifier or the second view with the second identifier and the view with the fourth identifier are viewed by the viewer as a left-eye image and a right-eye image respectively, the first identifier or the second identifier is shielded by the fourth identifier.

Alternatively, the image processing system further includes: a timing module configured to set a working duration for the processing module after the target image is displayed; and a first controller configured to, before the expiration of the working duration, control the display module to display the target image, and after the expiration of the working duration, turn off the processing module so as to enable the display module to directly display the original image.

Alternatively, the image processing system further includes: a determination module configured to determine whether or not restarting the processing module, and when determining restarting the processing module, output an instruction to restart the processing module; and a second control module configured to, when receiving the instruction to restart the processing module, restart the processing module, so as to enable the display module to display the target image, otherwise control the display module to directly display the original image.

Alternatively, the determination module is configured to determine restarting the processing module when a current viewer moves or a new viewer is present in a detection region.

Alternatively, the identifier is provided in the middle of an upper edge of the processed view.

In another aspect, the present disclosure provides in some embodiments an image processing method, including steps of: processing at least a portion of original views in an original image to be displayed currently, so as to obtain a target image including the processed views, each processed view including an identifier; and displaying the target image, so as to enable a viewer to determine, in accordance with a combination of the identifiers in the target image, a position for viewing a 3D image.

Alternatively, the original image includes a plurality of views arranged sequentially, and the step of processing at least a portion of the original views includes: setting a first identifier and a second identifier for a first view and a last view respectively, without setting any identifiers for the other views between the first view and the last view. When the first view with the first identifier and the last view with the second identifier are viewed by the viewer as a left-eye image and a right-eye image respectively, the first identifier and the second identifier are combined into a third identifier different from the first identifier and the second identifier, and the third identifier indicates that the viewer is located at a region where a left viewing area and a right viewing area are reversed.

Alternatively, the original image includes a plurality of views arranged sequentially, and the step of processing at least a portion of the original views includes setting a fourth identifier for a view other than a first view and a last view. When being viewed by the viewer as a left-eye image and a right-eye image respectively, the first view without any identifier and the last view without any identifier indicate that the viewer is located at a region where a left viewing area and a right viewing area are reversed.

Alternatively, the original image includes a plurality of views arranged sequentially, and the step of processing at least a portion of the original views includes: determining an amount of the views arranged sequentially; and when the amount of the views is greater than or equal to 5, setting a first identifier and a second identifier for a first view and a last view respectively, without any identifiers for the views between the first view and the last view, and when the amount of the views is less than 5, setting a fourth identifier for a view other than the first view and the last view. When the amount of the views is greater than or equal to 5 and the first view with the first identifier and the last view with the second identifier are viewed by the viewer as a left-eye image and a right-eye image respectively, the first identifier and the second identifier are combined into a third identifier different from the first identifier and the second identifier. The third identifier indicates that the viewer is located at a region where a left viewing area and a right viewing area are reversed. When the amount of the views is less than 5 and the first view without any identifier and the last view without any identifier are viewed by the viewer as a left-eye image and a right-eye image, the first view without any identifier and the last view without any identifier indicate that the viewer is located at a region where a left viewing area and a right viewing area are reversed.

Alternatively, the original image includes a plurality of views arranged sequentially, and the step of the processing at least a portion of the original views includes: setting a first identifier and a second identifier for a first view and a last view respectively; and setting a fourth identifier for a view other than the first view and the last view. When the first view with the first identifier and the second view with the second identifier are viewed by the viewer as a left-eye image and a right-eye image respectively, the first identifier and the second identifier are combined into a third identifier different from the first identifier and the second identifier, and the third identifier indicates that the viewer is located at a region where a left viewing area and a right viewing area are reversed. When the first view with the first identifier or the second view with the second identifier and the view with the fourth identifier are viewed by the viewer as a left-eye image and a right-eye image respectively, the first identifier or the second identifier is shielded by the fourth identifier.

Alternatively, the image processing method further includes: setting by a timing module a working duration for a processing module after the target image is displayed; and stopping displaying the at least one portion of the original views after the expiration of the working duration, and displaying the original image directly.

Alternatively, the image processing method further includes: determining whether or not restarting the processing module, and when determining restarting the processing module, outputting an instruction to restart the processing module; and when receiving the instruction to restart the processing module, restarting the processing module, so as to display the target image.

Alternatively, when a current viewer moves or a new viewer is present in a detection region, determining restarting the processing module.

Alternatively, the identifier is provided in the middle of an upper edge of the processed view.

In yet another aspect, the present disclosure provides in some embodiments a 3D display system including the above-mentioned image processing system.

In still yet another aspect, the present disclosure provides in some embodiments a method for determining a position for viewing a 3D image, including steps of: displaying a target image which includes a plurality of views, at least a portion of the views carrying identifiers; and using a combination of the identifiers in the target image to indicate a viewer whether or not the viewer is located at the position for viewing the 3D image.

According to the embodiments of the present disclosure, for a multiple-views glassless 3D display system, different images are viewed by the viewer at the region where the left view and the right view are reversed and at a continuous viewing region. After the original view is provided with the identifier, the viewer may view the identifier at the region where the left view and the right view are reversed and the continuous viewing region, so the viewer may determine an appropriate viewing position in accordance with the identifier.

According to the embodiments of the present disclosure, the position is determined in accordance the image viewed by the viewer, so the number of the viewers is not limited. In addition, it is merely required to modify image data to some extent, without any need to provide an adjustable light splitter or an external position sensor. As a result, it is able to remarkably reduce the production cost.

DETAILED DESCRIPTION

In the embodiments of the present disclosure, an identifier is provided in a view so as to enable a viewer to determine an appropriate viewing position in accordance with the identifier, thereby to guide the viewer to view a 3D image at an extremely low cost.

The term "view" refers to an image about a 3D scene viewed by a single eye (or photographed by a single-lens camera) at a specific position.

Figure 1:
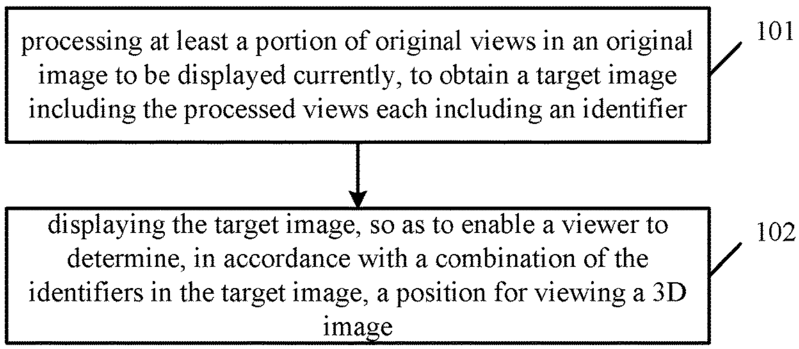
FIG. 1 is a flow chart of an image processing method according to one embodiment of the present disclosure.

Referring to FIG. 1, an image processing method in some embodiments of the present disclosure includes: Step 101 of processing at least a portion of original views in an original image to be displayed currently, to obtain a target image including the processed views each including an identifier; and Step 102 of displaying the target image, so as to enable a viewer to determine, in accordance with a combination of the identifiers in the target image, a position for viewing a 3D image.

Of course, before Step 101, the original image to be displayed currently that includes the original views may be acquired at first.

According to the embodiments of the present disclosure, for a multiple-views glassless 3D display system, different images are viewed by the viewer at a region where a left view and a right view are reversed and at a continuous viewing region. After the original view is provided with the identifier, the viewer may view the identifier at the region where the left view and the right view are reversed and/or the continuous viewing region, so the viewer may determine an appropriate viewing position in accordance with the identifier.

According to the embodiments of the present disclosure, the position is determined in accordance the image viewed by the viewer, so the number of the viewers is not limited. In addition, it is merely required to modify image data to some extent, without any need to provide an adjustable light splitter or an external position sensor. As a result, it is able to remarkably reduce the production cost.

The identifier may be provided at any position in each view. However, in order to minimize an influence on the original image and make the identifier more apparent, in some embodiments of the present disclosure, the identifier is provided in the middle of an upper edge of the view.

In some embodiments of the present disclosure, the identifiers may be provided in various forms, as long as different identifiers may be viewed by the viewer at the region where the left view and the right view are reversed and at the continuous region. The following description is given by taking N (N is greater than or equal to 3) views an example.

At first, a glassless 3D display system has a continuous viewing region (also referred to as an appropriate viewing region where a 3D image may be viewed). Sometimes, a viewer cannot view an identical 3D image, and even feels dizzy, when he is located at the region where a left view and a right view are reversed (also referred to as a dead region) beyond the appropriate viewing region.

Figure 2A:
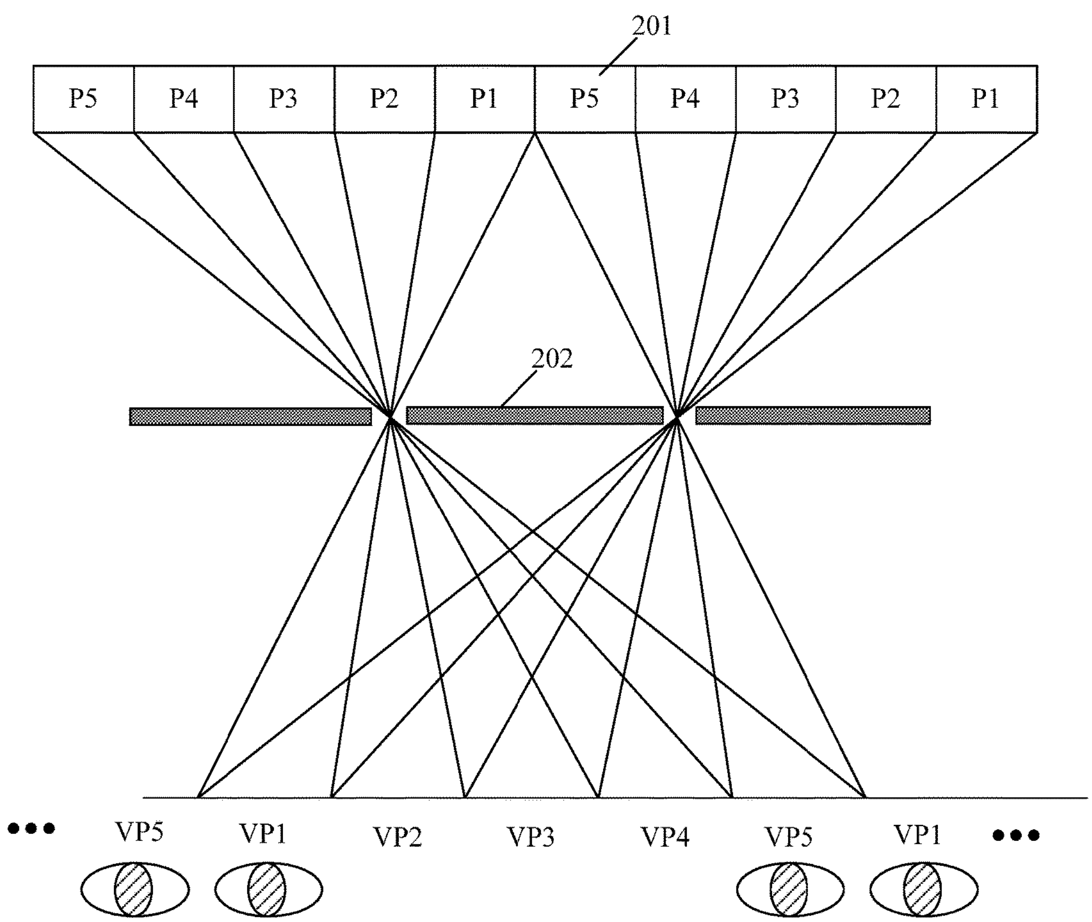
FIG. 2*a* is a schematic view showing a viewing region involved in glassless 3D display according to one embodiment of the present disclosure.

FIG. 2*a* is a schematic view showing the principle of the glassless 3D display using an image forming apparatus. The image forming apparatus may be a liquid crystal display device, a plasma display device, a field emission display device and an OLED display device that may display an image on the basis of data of a plurality of views. In the embodiments of the present disclosure, a liquid crystal display panel including a plurality of subpixels or pixels 201 is taken as an example. FIG. 2*a* merely shows ten subpixels or pixels 201, and actually, it may include tens of thousands of subpixels or pixels. The subpixels or pixels 201 in FIG. 2*a* are divided, on the basis of a spatial-multiplexing 3D display mode (where a left-eye image and a right-eye image are displayed simultaneously on a screen with the pixels being arranged in a staggered manner, and then viewed by the left and right eyes, respectively, using a special light control technique), into five kinds, e.g., P1, P2, P3, P4 and P5. Every five subpixels or pixels are combined into a group and arranged periodically so as to display an image including five views.

It should be appreciated that, the number of the kinds of the pixels depends on the number of the views included in the 3D image. For example, when four views are to be displayed, the pixels are divided into four kinds correspondingly, and when six views are to be displayed, the pixels are divided into six kinds.

A light splitter 202 is arranged at a display side so as to split the views. The light splitter 202 may be a slit grating, a lenticular grating, or a lenticular lens array capable of refracting and splitting the light.

The light splitter 202 may be used to split the image displayed on the liquid crystal display panel into a plurality of different views, and project the views in different directions. At this point, there is a plurality of viewing areas at a receiving side. Five viewing areas are shown in FIG. 2*a*, i.e., VP1, VP2, VP3, VP4 and VP5.

Figure 2B:
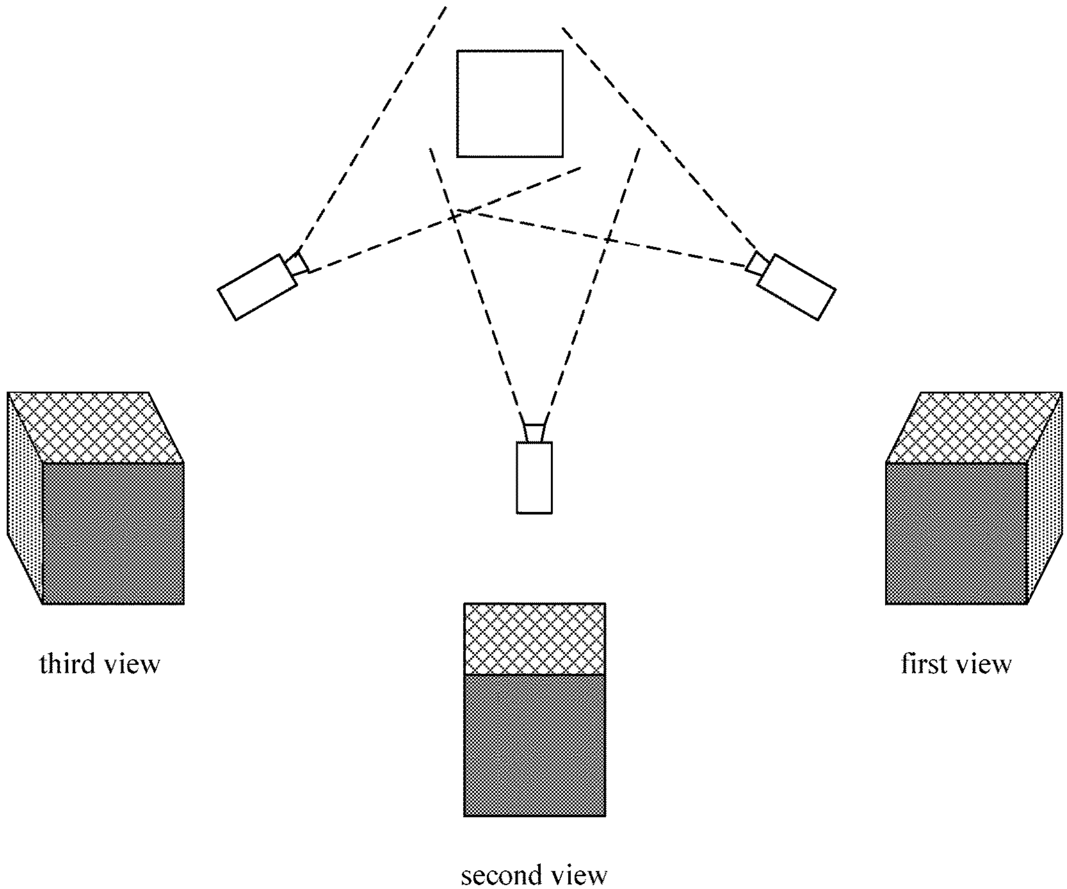
FIG. 2*b* is a schematic view showing N views involved in the glassless 3D display according to one embodiment of the present disclosure.

Usually, for the glassless 3D display system that displays N (N is greater than or equal to 3) views, the N original views from right to left correspond to N different viewing angles. Taking three views an example, FIG. 2*b* shows the views from right to left.

In the arrangement mode of the viewing areas in FIG. 2*a*, the consecutive VP1 to VP5 form a continuous viewing area where the 3D image may be viewed by the viewer's eyes comfortably. However, when the viewer's eyes are located at two adjacent continuous viewing regions respectively (i.e., the viewer is located at the region where the left viewing area and the right viewing area are reversed), the left view and the right view are reversed, and the viewer may feel dizzy.

As shown in FIG. 2*a* where five views are provided, at the region where the left viewing area and the right viewing area reversed, View 1 and View 5 are viewed by the viewer, and at this point, the right-eye image is viewed by the left eye of the viewer, and the left-eye image is viewed by the right eye of the viewer, i.e., the viewer cannot view the 3D image normally. At the continuous viewing region, a combination of two adjacent views is viewed by the viewer.

Actually, for the glassless 3D display system where N (N is greater than or equal to 3) views are displayed, a combination of View 1 and View N, i.e., a combination of a first view and a last view, may be viewed by the viewer at the region where the left viewing area and the right viewing area reversed.

Hence, the viewer needs to view different identifiers at the continuous viewing region and at the region where the left viewing area and the right viewing area are reversed, so as to determine his position.

It should be appreciated that, there exist two situations when different identifiers are viewed by the viewer at the continuous viewing region and at the region where the left viewing area and the right viewing area are reversed, i.e., a situation where no identifier is viewed at one region and an identifier is viewed at the other region, and a situation where different identifiers are viewed at the two regions respectively.

Figure 3:
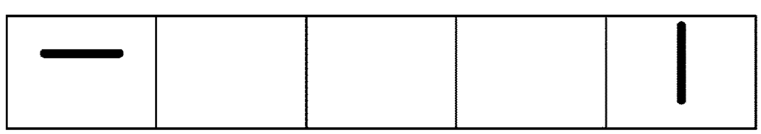
FIG. 3 is a schematic view showing an arrangement mode for identifiers according to one embodiment of the present disclosure.

As shown in FIG. 3, in some embodiments of the present disclosure, five views are to be displayed. A first view is provided with a first identifier (a horizontal line), and a fifth view is provided with a second identifier (a vertical line). The first identifier and the second identifier are combined into a third identifier (a crisscross) different from the first identifier and the second identifier. The other views are not modified.

In this case, when the viewer is located at the region where the left viewing area and the right viewing area are reversed, the first view and the fifth view may be viewed by the viewer. Hence, a combination of the horizontal line and the vertical line, i.e., the crisscross, may be viewed by the viewer.

When the viewer is located at the continuous viewing region, there exist the following three situations. 1. The first view other than the fifth view may be viewed by the viewer, i.e., at this point the horizontal line is viewed by the viewer. 2. The fifth view other than the first view may be viewed by the viewer, i.e., at this point the vertical line is viewed by the viewer. 3. Neither the first view nor the fifth view may be viewed by the viewer, i.e., at this point no identifier is viewed by the viewer.

It is found that, in these three situations, the identifier viewed by the viewer is different from the crisscross viewed by the viewer at the region where the left viewing area and the right viewing area are reversed.

In other words, in these situations, the viewer may determine that he is located at the region where the left viewing area and the right viewing area are reversed when the crisscross is viewed. At this point, the viewer may move to the left or right, until the horizontal line or the vertical line is viewed or no identifier is viewed.

Of course, it should be appreciated that, any other identifiers may be provided in the first view and the fifth view, as long as they may be combined into the other identifier. For example, the identifiers in the first view and the fifth view may be circles at different positions, or arrows located at an identical position but pointing to different directions.

Actually, for the glassless 3D display system where N (N is greater than or equal to 3) views, in the embodiments of the present disclosure, the first view and the last view in the N views arranged sequentially are provided with a first identifier and a second identifier, respectively, and the other views are not provided with any identifier. The first identifier and the second identifier may be combined into a third identifier different from the first identifier and the second identifier.

In some embodiments of the present disclosure, for the N views arranged sequentially, each view other than the first view and the last view is provided with an identifier. In this way, different identifiers may be also viewed by the viewer at the continuous viewing region and at the region where the left viewing area and the right viewing area are reversed. More details will be given as follows.

Figure 4:
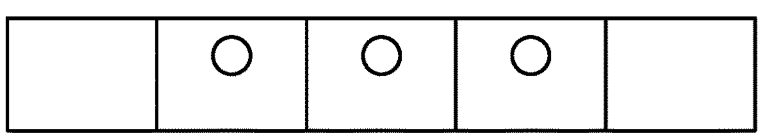
FIG. 4 is another schematic view showing the arrangement mode for identifiers according to one embodiment of the present disclosure.

As shown in FIG. 4, a second view, a third view and a fourth view are each provided with a circle, and the other views are not modified.

In this case, when the viewer is located at the region where the left viewing area and the right viewing area are reversed, he can view the first view and the fifth view simultaneously. Because the first view and the fifth view are not provided with any identifiers, no identifier may be viewed by the viewer.

When the viewer is located at the continuous viewing region, there exist the following three situations. 1. The first view other than the fifth view may be viewed by the viewer. At this point, although the first view is not provided with any identifier, the circle in the other view may be viewed by the viewer. 2. The fifth view other than the first view may be viewed by the viewer. At this point, although the fifth view is not provided with any identifier, the circle in the other view may be viewed by the viewer. 3. Neither the first view nor the fifth view may be viewed by the viewer. At this point, the cycle in the other view may be viewed by the viewer.

It is found that, in the above three situations, the circle may be viewed by the viewer at the continuous viewing region, while no identifier may be viewed at the region where the left viewing area and the right viewing area are reversed.

In other words, in these cases, the viewer may determine that he is located at the region where the left viewing area and the right viewing area are reversed when no identifier is viewed. At this point, the viewer may move to the left or right, until the circle is viewed.

In the above modes, the original views arranged sequentially are divided into two groups, one including the first view and the last view, and the other including the other views. In other words, in a first mode, the first group of views is provided with the identifiers, while in a second mode, the second group of views is provided with the identifiers. The two modes may be used separately.

It is found that, in order to reduce processing resources and improve a view processing speed, when N is greater than or equal to 5, the first mode may be adopted because fewer views are to be processed, and when N is less than 5, the second mode may be adopted because fewer views are to be processed.

In other words, when the original image includes a plurality of original views arranged sequentially, the step of processing at least a portion of the original views includes: determining an amount of the views arranged sequentially; and when the amount of the views is greater than or equal to 5, setting a first identifier and a second identifier for a first view and a last view respectively, without any identifiers for the other views, and when the amount of the views is less than 5, setting a fourth identifier for a view other than the first view and the last view.

The first identifier and the second identifier may be combined into a third identifier different from the first identifier and the second identifier.

In this way, it is able to select the modes in accordance with the amount of the views to be displayed, so as to determine the appropriate viewing area for the viewer conveniently.

In the above two modes, there is the situation where no identifier is viewed by the viewer. In order to determine the appropriate viewing area for the viewer in a more effective manner, in some embodiments of the present disclosure, when the original image includes a plurality of original views arranged sequentially, the step of processing at least a portion of the original views includes: setting a first identifier and a second identifier for a first view and a last view respectively; and setting a fourth identifier for a view other than the first view and the last view. The first identifier and the second identifier may be combined into a third identifier different from the first identifier and the second identifier. When one view with the first identifier or the second identifier and one view with the fourth identifier are viewed by the viewer as a left-eye image and a right-eye image respectively, the first identifier or the second identifier is shielded by the fourth identifier.

Figure 5:
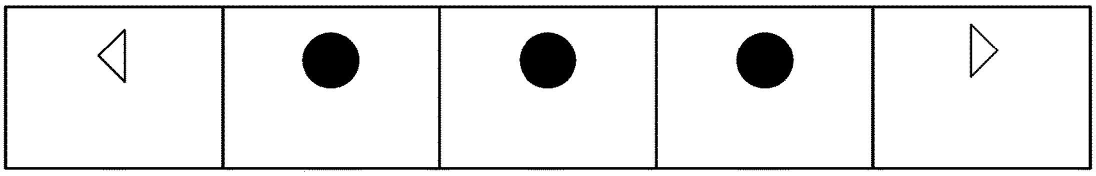
FIG. 5 is yet another schematic view showing the arrangement mode for identifiers according to one embodiment of the present disclosure.

As shown in FIG. 5, a second view, a third view and a fourth view are each provided with a solid circle, a first view is provided with a hollow arrow pointing to the left, and a fifth view is provided with a hollow arrow pointing to the right.

In order to ensure the viewer to view an accurate identifier at the continuous viewing region, when all the views are placed within an identical coordinate system, the hollow arrow pointing to the left and the hollow arrow pointing to the right in FIG. 5 need to be located within a region covered by the solid circle, and FIGS. 6*a*-6*d* show the sizes of the identifiers and the position relationship thereamong. It should be appreciated that, the images are merely for illustrative purposes in FIGS. 6*a*-6*d*, and they are not the images actually viewed by the viewer.

Figures 6A, 6B, 6C, 6D:
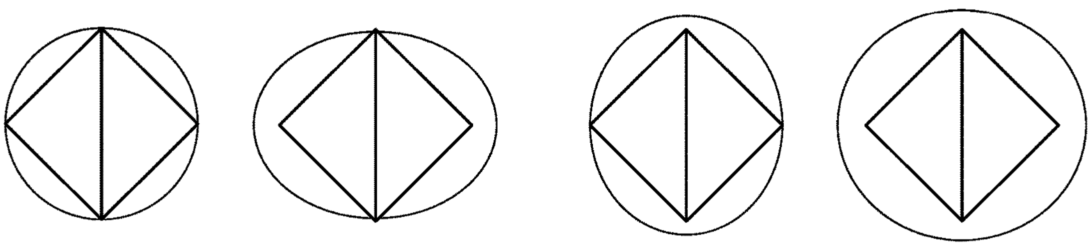
FIGS. 6*a*-6*l* are schematic views showing sizes of the identifiers in FIG. 5 and the position relationship therebetween.
Figures 6E, 6F, 6G, 6H:
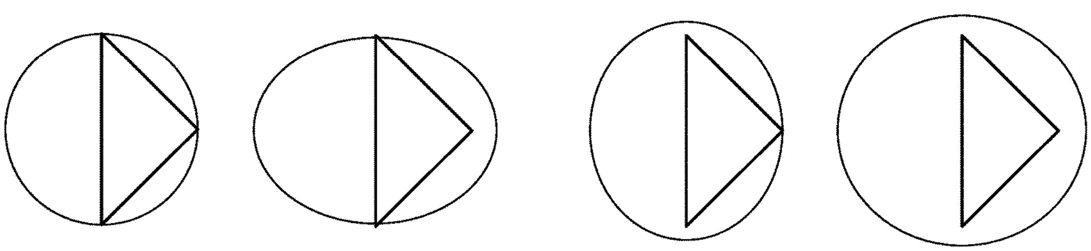
Figure 6I:
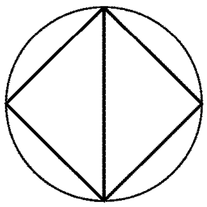
Figure 6J:
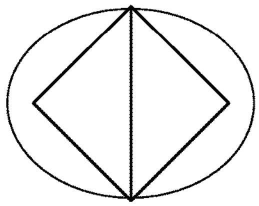
Figure 6K:
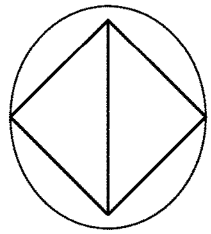
Figure 6L:
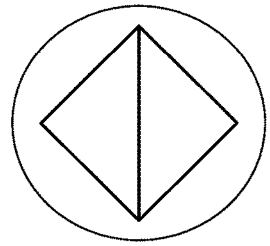

During the implementation, on the basis of the sizes of the three identifiers and the position relationship as shown in FIG. 6*a*, a combination of the hollow arrow pointing to the right and the solid circle as shown in FIG. 6*e* or a combination of the hollow arrow pointing to the left and the solid circle as shown in FIG. 6*i* may be actually viewed by the viewer. On the basis of the sizes of the three identifiers and the position relationship as shown in FIG. 6*b*, a combination of the hollow arrow pointing to the right and the solid circle as shown in FIG. 6*f* or a combination of the hollow arrow pointing to the left and the solid circle as shown in FIG. 6*j* may be actually viewed by the viewer. On the basis of the sizes of the three identifiers and the position relationship as shown in FIG. 6*c*, a combination of the hollow arrow pointing to the right and the solid circle as shown in FIG. 6*g* or a combination of the hollow arrow pointing to the left and the solid circle as shown in FIG. 6*k* may be actually viewed by the viewer. On the basis of the sizes of the three identifiers and the position relationship as shown in FIG. 6*d*, a combination of the hollow arrow pointing to right and the solid circle as shown in FIG. 6*h* or a combination of the hollow arrow pointing to the left and the solid circle as shown in FIG. 6*l* may be actually viewed by the viewer.

Then, in conjunction with colors and transparency of the identifiers, it is able to ensure that the first identifier or the second identifier is shielded by the fourth identifier when the view with the first or second identifier and the view with the fourth identifier are viewed by the viewer as the left-eye image and the right-eye image, respectively. More details will be given as follows.

When the hollow arrow pointing to the left/right and the solid circle are viewed simultaneously, the solid circle may be actually viewed by the viewer due to the above-mentioned position relationship therebetween.

Figure 7:
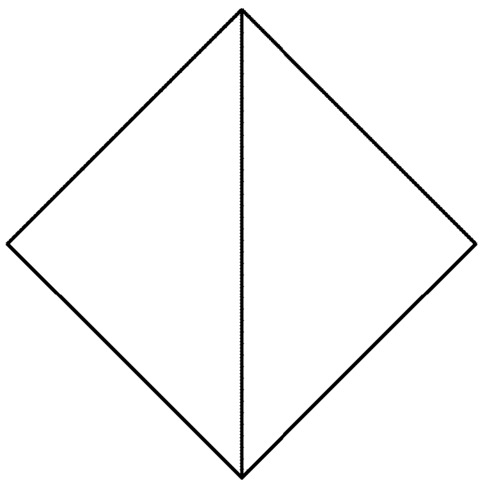
FIG. 7 is a schematic view showing an identifier viewed by a viewer when the identifiers in FIG. 5 are adopted and the viewer is located at a region where a left viewing area and a right viewing area are reversed.

At this point, when the viewer is located at the region where the left viewing area and the right viewing area are reversed, the first view and the fifth view may be viewed by the viewer simultaneously, i.e., a combination of the hollow arrow pointing to the right and the hollow arrow pointing to the left as shown in FIG. 7 may be viewed by the viewer. When the viewer is located at the continuous viewing region, there exist the following three situations.

1. The first view other than the fifth view may be viewed by the viewer. At this point, although the first view is provided with the hollow arrow pointing to the left, the solid circle in the other view is actually viewed by the viewer due to the above-mentioned position relationship therebetween.

2. The fifth view other than the first view may be viewed by the viewer. At this point, although the fifth view is provided with the hollow arrow pointing to the right, the solid circle in the other view is actually viewed by the viewer due to the above-mentioned position relationship therebetween.

3. Neither the first view nor the fifth view may be viewed by the viewer. At this point, the solid circle in the other view is actually viewed by the viewer.

It is found that, in these three situations, the solid circle may be viewed by the viewer at the continuous viewing region, while at the region where the left viewing area and the right viewing area are reversed, a combination of the hollow arrow pointing to the right and the hollow arrow pointing to the left as shown in FIG. 7 may be viewed by the viewer.

In other words, in these cases, the viewer may determine that he is located at the region where the left viewing area and the right viewing area are reversed when the combination of the hollow arrow pointing to the right and the hollow arrow pointing to the left is viewed by the viewer. At this point, the viewer may move to the left or right, until the solid circle is viewed, i.e., the viewer is currently located at the continuous viewing region.

It is found that, in the above mode, an identifier may be viewed by the viewer at any region, and the viewer may determine whether or not he is located at the appropriate viewing position in accordance with the identifier.

As can be seen from the above, in order to indicate the appropriate viewing position for the viewer, it is required to provide the identifier for some of the views in the original image to be displayed, and such an image processing operation requires a large quantity of processing resources. However, in most cases, the viewer may not view the 3D image in a moving state. Hence, when the viewer has already been located at the appropriate viewing region but the identifiers are still being provided to the views, the user experience will be adversely affected and the processing resources will be wasted.

In this regard, in some embodiments of the present disclosure, the image processing method further includes: setting by a timing module a working duration for a processing module after the target image is displayed; and stopping displaying the at least one portion of the original views after the expiration of the working duration, and displaying the original image directly.

After the viewer moves to the continuous viewing position, the processing module is turned off, so as to improve the user experience and save the processing resources.

However, although the viewer may not change his position when he is viewing the 3D image, some sudden movements may occur (e.g., the viewer may adjust his sitting posture), or a new viewer may move into the continuous viewing region. At this point, the processing module should be restarted, so as to guide the current viewer or the new viewer into the continuous viewing region.

In this regard, in some embodiments of the present disclosure, the image processing method further includes: determining whether or not it is required to restart the processing module, and when it is determined that the processing module is required to be restarted, outputting an instruction to restart the processing module; and when the instruction to restart the processing module is received, restarting the processing module, so as to display the target image.

In some embodiments of the present disclosure, the processing module is required to be restarted in the following situations. 1. The current viewer changes his position. When the current viewer changes his position, he may move from the continuous viewing region into the region where the left viewing area and the right viewing area are reversed. At this point, the processing module should be restarted, so as to guide the current viewer to move back to the continuous viewing region. 2. A new viewer occurs. When the new viewer occurs, he may not know whether he is located at the continuous viewing region. At this point, the processing module should be restarted, so as to guide the new viewer to move to the continuous viewing region.

A capturing system may be used to determine whether or not the new viewer occurs or whether or not the current viewer has changed his position. The capturing system is known in the art, and thus will not be particularly defined herein.

Figure 8:
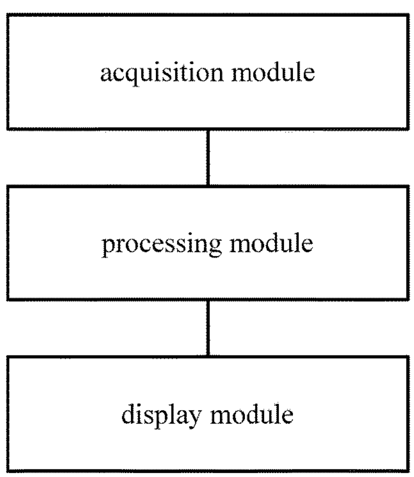
FIG. 8 is a schematic view showing an image processing system according to one embodiment of the present disclosure.

The present disclosure further provides in some embodiments an image processing system which, as shown in FIG. 8, includes: a processing module configured to process at least a portion of original views in an original image to be displayed currently, so as to obtain a target image, each processed view including an identifier; and a display module configured to display the target image, so as to enable a viewer to determine, in accordance with a combination of the identifiers in the target image, a position for viewing a 3D image.

Of course, the image processing system may further include an acquisition module configured to acquire in advance the original image including the original views.

The identifier may be provided in the middle of an upper edge of each view.

In some embodiments of the present disclosure, the original image includes a plurality of original views arranged sequentially, and the processing module includes: a first setting module configured to set a first identifier and a second identifier for a first view and a last view respectively. The first identifier and the second identifier may be combined into a third identifier different from the first identifier and the second identifier.

Alternatively, the processing module includes a second setting module configured to set a fourth identifier for a view other than the first view and the last view.

Alternatively, the processing module includes: a view amount determination module configured to determine an amount of the views arranged sequentially; and a third setting module configured to, when the amount of the views is greater than or equal to 5, set a first identifier and a second identifier for a first view and a last view respectively, and when the amount of the views is less than 5, set a fourth identifier for a view other than the first view and the last view. The first identifier and the second identifier may be combined into a third identifier different from the first identifier and the second identifier.

Alternatively, the processing module includes: a fourth setting module configured to set a first identifier and a second identifier for a first view and a last view respectively; and a fifth setting module configured to set a fourth identifier for a view other than the first view and the last view. The first identifier and the second identifier may be combined into a third identifier different from the first identifier and the second identifier, and located within a region covered by the fourth identifier.

The image processing system may further include: a timing module configured to set a working duration for the processing module after the target image is displayed; and a first controller configured to, before the expiration of the working duration, control the display module to display the target image, and after the expiration of the working duration, turn off the processing module so as to enable the display module to directly display the original image.

The image processing system may further include: a determination module configured to determine whether or not it is required to restart the processing module, and when it is determined that the processing module is required to be restarted, output an instruction to restart the processing module; and a second control module configured to, when the instruction to restart the processing module is received, restart the processing module, so as to enable the display module to display the target image, otherwise control the display module to directly display the original image.

The determination module is configured to determine that the processing module is required to be restarted when the current viewer moves or a new viewer occurs at the detection region.

The present disclosure further provides in some embodiments a 3D display system including the above-mentioned image processing system. The 3D display system may be an electronic device such as a television, a mobile phone or a personal digital assistant (PDA).

The present disclosure further provides in some embodiments a method for determining a position for viewing a 3D image, which includes steps of: displaying a glassless display image carrying identifiers; and determining, by a viewer, whether or not he is located at an optimum viewing position for viewing the glasses display image in accordance with a combination of the identifiers.

Alternatively, the optimum viewing position is a position where a distance between the viewer and a display screen of an electronic device displaying the glassless display image is 3 or 4 times a length of a diagonal line of the display screen.

The present disclosure is described hereinabove with reference to the flow charts, the block diagrams and/or the embodiments. It should be appreciated that, in the case that these flow charts, block diagrams and/or embodiments include one or more functions and/or operations, each function and/or operation may be achieved separately or jointly through hardware, software, firmware or a combination thereof. In one embodiment, all or several parts of the present disclosure may be achieved by an application specific integrated circuit (ASIC), a field programmable gate array (FPGA), a digital signal processor (DSP) or any other integrated circuits. All modules in the embodiments of the present disclosure may be provided in a mechanical or electronic form. For example, the module may include a permanent circuit or a logic element for a specific operation, or it may include a programmable logic element or circuit temporarily configured by software (e.g., a general purpose processor or any other programmable processors) for a specific operation. However, it should be appreciated that, some aspects of the present disclosure may be integrally or partially implemented as integrated circuits, as one or more computer programs executable by one or more computers (e.g., one or more programs executable by one or more computer systems), as one or more programs executable by one or more processors (e.g., one or more programs executable by one or more microprocessors), as firmware, or a combination thereof. On the basis of the present disclosure, a person skilled in the art has the capability to design the corresponding circuits, and/or write software and/or firmware.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. An image processing system realized by a computer, comprising:

a processing circuit configured to process at least a portion of original views in an original image to be displayed currently, so as to obtain a target image including the processed views, each processed view including an identifier; and a display circuit configured to display the target image, so as to enable a viewer to determine, in accordance with a combination of the identifiers in the target image, a position for viewing a 3D image, wherein the original image comprises a plurality of views arranged sequentially, and wherein:

the processing circuit comprises a first setting circuit configured to set a first identifier and a second identifier for a first view and a last view respectively, without any identifiers for the other views between the first view and the last view, and when the first view with the first identifier and the last view with the second identifier are viewed by the viewer as a left-eye image and a right-eye image respectively, the first identifier and the second identifier are combined into a third identifier different from the first identifier and the second identifier, and the third identifier indicates that the viewer is located at a region where a left viewing area and a right viewing area are reversed, or wherein:

the processing circuit comprises a second setting circuit configured to set a fourth identifier for a view other than a first view and a last view, and when being viewed by the viewer as a left-eye image and a right-eye image respectively, the first view without any identifier and the last view without any identifier indicate that the viewer is located at a region where a left viewing area and a right viewing area are reversed, or wherein:

the processing circuit comprises a view amount determination circuit configured to determine an amount of the views arranged sequentially, and a third setting circuit configured to, when the amount of the views is greater than or equal to 5, set a first identifier and a second identifier for a first view and a last view respectively, without any identifiers for the views between the first view and the last view, and when the amount of the views is less than 5, set a fourth identifier for a view other than the first view and the last view, when the amount of the views is greater than or equal to 5 and the first view with the first identifier and the last view with the second identifier are viewed by the viewer as a left-eye image and a right-eye image respectively, the first identifier and the second identifier are combined into a third identifier different from the first identifier and the second identifier; the third identifier indicates that the viewer is located at a region where a left viewing area and a right viewing area are reversed, and when the amount of the views is less than 5 and the first view without any identifier and the last view without any identifier are viewed by the viewer as a left-eye image and a right-eye image, the first view without any identifier and the last view without any identifier indicate that the viewer is located at the region where the left viewing area and the right viewing area are reversed, or wherein:

the processing circuit comprises a fourth setting circuit configured to set a first identifier and a second identifier for a first view and a last view respectively, and a fifth setting circuit configured to set a fourth identifier for a view other than the first view and the last view, when the first view with the first identifier and the last view with the second identifier are viewed by the viewer as a left-eye image and a right-eye image respectively, the first identifier and the second identifier are combined into a third identifier different from the first identifier and the second identifier, and the third identifier indicates that the viewer is located at a region where a left viewing area and a right viewing area are reversed, and when the first view with the first identifier or the last view with the second identifier and the view with the fourth identifier are viewed by the viewer as a left-eye image and a right-eye image respectively, the first identifier or the second identifier is shielded by the fourth identifier.

2. The image processing system according to claim 1, further comprising:

a timing circuit configured to set a working duration for the processing circuit after the target image is displayed; and a first controller configured to, before an expiration of the working duration, control the display circuit to display the target image, and after the expiration of the working duration, turn off the processing circuit so as to enable the display circuit to directly display the original image.

3. The image processing system according to claim 2, further comprising:

a determination circuit configured to determine whether or not restarting the processing circuit, and when determining restarting the processing circuit, output an instruction to restart the processing circuit; and a second control circuit configured to, when receiving the instruction to restart the processing circuit, restart the processing circuit, so as to enable the display circuit to display the target image, otherwise control the display circuit to directly display the original image.

4. The image processing system according to claim 3, wherein the determination circuit is configured to determine restarting the processing circuit when a current viewer moves or a new viewer is present in a detection region.

5. The image processing system according to claim 1, wherein the identifier is provided in the middle of an upper edge of the processed view.

6. An image processing method realized by a computer, comprising steps of:

processing at least a portion of original views in an original image to be displayed currently, so as to obtain a target image including the processed views, each processed view including an identifier; and displaying the target image, so as to enable a viewer to determine, in accordance with a combination of the identifiers in the target image, a position for viewing a 3D image, wherein the original image comprises a plurality of views arranged sequentially, and wherein:

the step of processing at least a portion of the original views comprises setting a first identifier and a second identifier for a first view and a last view respectively, without setting any identifiers for the other views between the first view and the last view, and when the first view with the first identifier and the last view with the second identifier are viewed by the viewer as a left-eye image and a right-eye image respectively, the first identifier and the second identifier are combined into a third identifier different from the first identifier and the second identifier, and the third identifier indicates that the viewer is located at a region where a left viewing area and a right viewing area are reversed, or wherein:

the step of processing at least a portion of the original views comprises setting a fourth identifier for a view other than a first view and a last view, and when being viewed by the viewer as a left-eye image and a right-eye image respectively, the first view without any identifier and the last view without any identifier indicate that the viewer is located at a region where a left viewing area and a right viewing area are reversed, or wherein:

the step of processing at least a portion of the original views comprises:

determining an amount of the views arranged sequentially, and when the amount of the views is greater than or equal to 5, setting a first identifier and a second identifier for a first view and a last view respectively, without any identifiers for the views between the first view and the last view, and when the amount of the views is less than 5, setting a fourth identifier for a view other than the first view and the last view, when the amount of the views is greater than or equal to 5 and the first view with the first identifier and the last view with the second identifier are viewed by the viewer as a left-eye image and a right-eye image respectively, the first identifier and the second identifier are combined into a third identifier different from the first identifier and the second identifier; the third identifier indicates that the viewer is located at a region where a left viewing area and a right viewing area are reversed, and when the amount of the views is less than 5 and the first view without any identifier and the last view without any identifier are viewed by the viewer as a left-eye image and a right-eye image, the first view without any identifier and the last view without any identifier indicate that the viewer is located at the region where the left viewing area and the right viewing area are reversed, or wherein:

the step of the processing at least a portion of the original views comprises:

setting a first identifier and a second identifier for a first view and a last view respectively, and setting a fourth identifier for a view other than the first view and the last view, when the first view with the first identifier and the last view with the second identifier are viewed by the viewer as a left-eye image and a right-eye image respectively, the first identifier and the second identifier are combined into a third identifier different from the first identifier and the second identifier, and the third identifier indicates that the viewer is located at a region where a left viewing area and a right viewing area are reversed, and when the first view with the first identifier or the last view with the second identifier and the view with the fourth identifier are viewed by the viewer as a left-eye image and a right-eye image respectively, the first identifier or the second identifier is shielded by the fourth identifier.

7. The image processing method according to claim 6, further comprising:

setting by a timing circuit a working duration for a processing circuit after the target image is displayed; and stopping displaying the at least one portion of the original views after an expiration of the working duration, and displaying the original image directly.

8. The image processing method according to claim 7, further comprising:

determining whether or not restarting the processing circuit, and when determining restarting the processing circuit, outputting an instruction to restart the processing circuit; and when receiving the instruction to restart the processing circuit, restarting the processing circuit, so as to display the target image.

9. The image processing method according to claim 8, wherein when a current viewer moves or a new viewer is present in a detection region, determining restarting the processing circuit.

10. The image processing method according to claim 6, wherein the identifier is provided in the middle of an upper edge of the processed view.

11. A three-dimensional (3D) display system comprising an image processing system realized by a computer;

wherein the image processing system comprises:

a processing circuit configured to process at least a portion of original views in an original image to be displayed currently, so as to obtain a target image including the processed views, each processed view including an identifier and a display circuit configured to display the target image, so as to enable a viewer to determine, in accordance with a combination of the identifiers in the target image, a position for viewing a 3D image, wherein the original image comprises a plurality of views arranged sequentially, and wherein:

the processing circuit comprises a first setting circuit configured to set a first identifier and a second identifier for a first view and a last view respectively, without any identifiers for the other views between the first view and the last view, and when the first view with the first identifier and the last view with the second identifier are viewed by the viewer as a left-eye image and a right-eye image respectively, the first identifier and the second identifier are combined into a third identifier different from the first identifier and the second identifier, and the third identifier indicates that the viewer is located at a region where a left viewing area and a right viewing area are reversed, or wherein:

the processing circuit comprises a second setting circuit configured to set a fourth identifier for a view other than a first view and a last view, and when being viewed by the viewer as a left-eye image and a right-eye image respectively, the first view without any identifier and the last view without any identifier indicate that the viewer is located at a region where a left viewing area and a right viewing area are reversed, or wherein:

the processing circuit comprises a view amount determination circuit configured to determine an amount of the views arranged sequentially, and a third setting circuit configured to, when the amount of the views is greater than or equal to 5, set a first identifier and a second identifier for a first view and a last view respectively, without any identifiers for the views between the first view and the last view, and when the amount of the views is less than 5, set a fourth identifier for a view other than the first view and the last view, when the amount of the views is greater than or equal to 5 and the first view with the first identifier and the last view with the second identifier are viewed by the viewer as a left-eye image and a right-eye image respectively, the first identifier and the second identifier are combined into a third identifier different from the first identifier and the second identifier; the third identifier indicates that the viewer is located at a region where a left viewing area and a right viewing area are reversed, and when the amount of the views is less than 5 and the first view without any identifier and the last view without any identifier are viewed by the viewer as a left-eye image and a right-eye image, the first view without any identifier and the last view without any identifier indicate that the viewer is located at the region where the left viewing area and the right viewing area are reversed, or wherein:

the processing circuit comprises a fourth setting circuit configured to set a first identifier and a second identifier for a first view and a last view respectively, and a fifth setting circuit configured to set a fourth identifier for a view other than the first view and the last view, when the first view with the first identifier and the last view with the second identifier are viewed by the viewer as a left-eye image and a right-eye image respectively, the first identifier and the second identifier are combined into a third identifier different from the first identifier and the second identifier, and the third identifier indicates that the viewer is located at a region where a left viewing area and a right viewing area are reversed, and when the first view with the first identifier or the last view with the second identifier and the view with the fourth identifier are viewed by the viewer as a left-eye image and a right-eye image respectively, the first identifier or the second identifier is shielded by the fourth identifier.

12. A method for determining a position for viewing one or more three-dimensional (3D) images, comprising steps of:

displaying a target image which includes a plurality of views arranged sequentially, at least a portion of the views carrying identifiers; and using a combination of the identifiers in the target image to indicate a viewer whether or not the viewer is located at the position for viewing the 3D image, wherein:

the step of displaying a target image which includes a plurality of views arranged sequentially comprises setting a first identifier and a second identifier for a first view and a last view respectively, without setting any identifiers for the other views between the first view and the last view, and when the first view with the first identifier and the last view with the second identifier are viewed by the viewer as a left-eye image and a right-eye image respectively, the first identifier and the second identifier are combined into a third identifier different from the first identifier and the second identifier, and the third identifier indicates that the viewer is located at a region where a left viewing area and a right viewing area are reversed, or wherein:

the step of displaying a target image which includes a plurality of views arranged sequentially comprises setting a fourth identifier for a view other than a first view and a last view, and when being viewed by the viewer as a left-eye image and a right-eye image respectively, the first view without any identifier and the last view without any identifier indicate that the viewer is located at a region where a left viewing area and a right viewing area are reversed, or wherein:

the step of displaying a target image which includes a plurality of views arranged sequentially comprises:

determining an amount of the views arranged sequentially, and when the amount of the views is greater than or equal to 5, setting a first identifier and a second identifier for a first view and a last view respectively, without any identifiers for the views between the first view and the last view, and when the amount of the views is less than 5, setting a fourth identifier for a view other than the first view and the last view, when the amount of the views is greater than or equal to 5 and the first view with the first identifier and the last view with the second identifier are viewed by the viewer as a left-eye image and a right-eye image respectively, the first identifier and the second identifier are combined into a third identifier different from the first identifier and the second identifier; the third identifier indicates that the viewer is located at a region where a left viewing area and a right viewing area are reversed, and when the amount of the views is less than 5 and the first view without any identifier and the last view without any identifier are viewed by the viewer as a left-eye image and a right-eye image, the first view without any identifier and the last view without any identifier indicate that the viewer is located at the region where the left viewing area and the right viewing area are reversed, or wherein:

the step of displaying a target image which includes a plurality of views arranged sequentially comprises:

setting a first identifier and a second identifier for a first view and a last view respectively, and setting a fourth identifier for a view other than the first view and the last view, when the first view with the first identifier and the last view with the second identifier are viewed by the viewer as a left-eye image and a right-eye image respectively, the first identifier and the second identifier are combined into a third identifier different from the first identifier and the second identifier, and the third identifier indicates that the viewer is located at a region where a left viewing area and a right viewing area are reversed, and when the first view with the first identifier or the last view with the second identifier and the view with the fourth identifier are viewed by the viewer as a left-eye image and a right-eye image respectively, the first identifier or the second identifier is shielded by the fourth identifier.

* * * * *